US009738836B2

(12) United States Patent
Reid et al.

(10) Patent No.: US 9,738,836 B2
(45) Date of Patent: Aug. 22, 2017

(54) FLUID INJECTION NOZZLE FOR FLUID BED REACTORS

(71) Applicants: Kevin Reid, Edmonton (CA); Jennifer McMillan, Edmonton (CA); Konstantin Pougatch, Port Moody (CA); Martha E. Salcudean, Vancouver (CA)

(72) Inventors: Kevin Reid, Edmonton (CA); Jennifer McMillan, Edmonton (CA); Konstantin Pougatch, Port Moody (CA); Martha E. Salcudean, Vancouver (CA)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 14/812,363

(22) Filed: Jul. 29, 2015

(65) Prior Publication Data
US 2016/0060541 A1    Mar. 3, 2016

Related U.S. Application Data

(60) Provisional application No. 62/042,911, filed on Aug. 28, 2014.

(51) Int. Cl.
*C10B 31/00* (2006.01)
*C10B 31/12* (2006.01)
(Continued)

(52) U.S. Cl.
CPC ............ *C10G 9/005* (2013.01); *B01J 8/1827* (2013.01); *B05B 7/0425* (2013.01); *C10B 31/12* (2013.01);
(Continued)

(58) Field of Classification Search
CPC . C10G 9/00; C10G 9/005; C10G 9/28; C10G 9/32; C10G 2300/10;
(Continued)

(56) References Cited

U.S. PATENT DOCUMENTS 2,546,570 A    3/1951 Vance, Jr.
3,443,757 A    5/1969 Townend
(Continued)

FOREIGN PATENT DOCUMENTS

CA    2224615     12/1997
EP    0318185 A1    5/1989
(Continued)

OTHER PUBLICATIONS

H. Bi, H. Cui, J. Grace, A. Kern, C.J. Lim, D. Rusnell, X. Song and C. McKnight, "Flooding of Gas-Solids Countercurrent Flow in Fluidized Beds", Ind. Eng. Chem. Res., 2004, 43, pp. 5611-5619.
(Continued)

*Primary Examiner* — Natasha Young
(74) *Attorney, Agent, or Firm* — Chad A. Guice

(57) ABSTRACT

The liquid feed nozzle assemblies for a circulating fluid bed reactor comprise (i) a throttle body premixer to combine liquid feed with atomization steam to form a liquid feed/steam mixture comprising gas bubbles in liquid; (ii) a conduit connected to the premixer and to a discharge nozzle to convey a flow of the liquid/steam mixture created by the premixer to the nozzle body; (iii) a discharge nozzle connected to the flow conduit to shear the liquid feed/steam mixture to create liquid feed droplets of reduced size and (iv) a disperser at the outlet of the discharge nozzle to provide a spray jet of liquid feed having an increased surface area relative to a cylindrical jet. The nozzle assembles are particularly useful in fluid coking units using heavy oil feeds such a tar sands bitumen.

20 Claims, 4 Drawing Sheets

(51) Int. Cl.
*B01J 8/00* (2006.01)
*B01J 8/18* (2006.01)
*C10B 55/10* (2006.01)
*C10G 9/00* (2006.01)
*C10G 9/32* (2006.01)
*C10J 3/48* (2006.01)
*B05B 7/04* (2006.01)
*C10B 55/00* (2006.01)
*C10B 55/02* (2006.01)
*C10B 55/04* (2006.01)
*C10B 55/08* (2006.01)
*C10G 9/28* (2006.01)
*C10J 3/00* (2006.01)
*C10J 3/46* (2006.01)

(52) U.S. Cl.
CPC .............. *C10B 55/10* (2013.01); *C10G 9/32* (2013.01); *C10J 3/48* (2013.01); *B01J 2208/00902* (2013.01); *B01J 2208/00911* (2013.01); *C10G 2300/107* (2013.01); *C10G 2300/1033* (2013.01); *C10G 2300/1077* (2013.01); *C10J 2300/0943* (2013.01)

(58) Field of Classification Search
CPC ........ C10G 2300/033; C10G 2300/107; C10G 2300/1077; B01J 8/00; B01J 8/18; B01J 8/1818; B01J 8/1827; B01J 2208/00796; B01J 2208/00893; B01J 2208/00902; B01J 2208/00911; C10L 331/00; C10L 331/12; C10L 355/00; C10L 355/02; C10L 355/04; C10L 355/08; C10L 355/10; C10J 3/00; C10J 3/46; C10J 3/48; C10J 2300/00; C10J 2300/09; C10J 2300/0913; C10J 2300/0943
See application file for complete search history.

(56) References Cited

U.S. PATENT DOCUMENTS

| | | |
|---|---|---|
| 5,289,976 A | 3/1994 | Dou et al. |
| 6,003,789 A | 12/1999 | Base et al. |
| 7,025,874 B2 | 4/2006 | Chan et al. |
| 7,140,558 B2 | 11/2006 | McCracken et al. |
| 2012/0063961 A1 | 3/2012 | Chan et al. |
| 2013/0048539 A1 | 2/2013 | Salazar et al. |

FOREIGN PATENT DOCUMENTS

| | | |
|---|---|---|
| EP | 0546739 A2 | 6/1993 |
| GB | 2172099 A | 9/1986 |
| WO | WO8705043 A1 | 8/1987 |
| WO | WO2011150012 A2 | 12/2011 |

OTHER PUBLICATIONS

P. House, M. Saberian, C.L. Briens, F. Berruti and E. Chan, "Injection of a Liquid Spray into a Fluidized Bed: Particle-Liquid Mixing and Impact on Fluid Coker Yields", Ind. Eng. Chem, Res., 43 (18), pp. 5663-5669.

PCT Application No. PCT/US2015/042662, related to Attorney's Reference No. 2014EM225-US2, Communication from the International Searching Authority, International Search Report and Written Opinion, Forms PCT/ISA/220, PCT/ISA/210 and PCT/ISA/237, dated May 11, 2015, 11 pages.

FLUID INJECTION NOZZLE FOR FLUID BED REACTORS

CROSS-REFERENCE TO RELATED APPLICATIONS

This application claims priority to U.S. Provisional Application Ser. No. 62/042,911, filed on Aug. 28, 2014, herein incorporated by reference in its entirety.

FIELD OF THE INVENTION

This invention relates to a nozzle assembly useful for injecting fluids into circulating fluid bed reactors. It relates more particularly to a nozzle assembly useful for injecting heavy oils such as petroleum resids and bitumens into fluid coking reactors.

BACKGROUND OF THE INVENTION

Circulating fluid bed (CFB) reactors are well known devices that can be used to carry out a variety of multiphase chemical reactions. In this type of reactor, a fluid (gas or liquid) is passed through a granular solid material at velocities high enough to suspend the solid and cause it to behave as though it were a fluid. Fluidization is maintained by means of fluidizing gas such as air, steam or reactant gas injected through a distributor (grid, spargers or other means) at the base of the reactor. CFB reactors are now used in many industrial applications, among which are catalytic cracking of petroleum heavy oils, olefin polymerization, coal gasification, and water and waste treatment. One major utility is in the field of circulating fluid bed combustors where coal or another high sulfur fuel is burned in the presence of limestone to reduce SOx emissions; emissions of nitrogen oxides is also reduced as a result of the relatively lower temperatures attained in the bed. Another application is in the fluidized bed coking processes known as fluid coking and its variant, Flexicoking™, both of which were developed by Exxon Research and Engineering Company.

Fluidized bed coking is a petroleum refining process in which heavy petroleum feeds, typically the non-distillable residue (resid) from fractionation or heavy oils are converted to lighter, more useful products by thermal decomposition (coking) at elevated reaction temperatures, typically about 480 to 590° C. (about 900 to 1100° F.), and in most cases from 500 to 550° C. (about 930 to 1020° F.). Heavy oils which may be processed by the fluid coking process include heavy atmospheric resids, aromatic extracts, asphalts, and bitumens from tar sands, tar pits and pitch lakes of Canada (Athabasca, Alta.), Trinidad, Southern California (La Brea, Los Angeles), McKittrick (Bakersfield, Calif.), Carpinteria (Santa Barbara County, Calif.), Lake Bermudez (Venezuela) and similar deposits such as those found in Texas, Peru, Iran, Russia and Poland. The process is carried out in a unit with a large reactor vessel containing hot coke particles which are maintained in the fluidized condition at the required reaction temperature with steam injected at the bottom of the vessel with the average direction of movement of the coke particles being downwards through the bed. The heavy oil feed is heated to a pumpable temperature, typically in the range of 350 to 400° C. (about 660 to 750° F.) mixed with atomizing steam, and fed through multiple feed nozzles arranged at several successive levels in the reactor. The steam is injected into a stripper section at the bottom of the reactor and passes upwards through the coke particles in the stripper as they descend from the main part of the reactor above. A part of the feed liquid coats the coke particles in the fluidized bed and subsequently decomposes into layers of solid coke and lighter products which evolve as gas or vaporized liquid. Reactor pressure is relatively low in order to favor vaporization of the hydrocarbon vapors, typically in the range of about 120 to 400 kPag (about 17 to 58 psig), and most usually from about 200 to 350 kPag (about 29 to 51 psig). The light hydrocarbon products of the coking (thermal cracking) reactions vaporize, mix with the fluidizing steam and pass upwardly through the fluidized bed into a dilute phase zone above the dense fluidized bed of coke particles. This mixture of vaporized hydrocarbon products formed in the coking reactions continues to flow upwardly through the dilute phase with the steam at superficial velocities of about 1 to 2 meters per second (about 3 to 6 feet per second), entraining some fine solid particles of coke. Most of the entrained solids are separated from the gas phase by centrifugal force in one or more cyclone separators, and are returned to the dense fluidized bed by gravity through the cyclone diplegs. The mixture of steam and hydrocarbon vapor from the reactor is subsequently discharged from the cyclone gas outlets into a scrubber section in a plenum located above the reaction section and separated from it by a partition. It is quenched in the scrubber section by contact with liquid descending over scrubber sheds in a scrubber section. A pumparound loop circulates condensed liquid to an external cooler and back to the top row of scrubber section to provide cooling for the quench and condensation of the heaviest fraction of the liquid product. This heavy fraction is typically recycled to extinction by feeding back to the fluidized bed reaction zone.

Components of the feed that are not immediately vaporized coat the coke particles in the reactor and are subsequently decomposed into layers of solid coke and lighter products which evolve as gas or vaporized liquids. During the contacting of the feed with the fluidized bed, some coke particles may become unevenly or too heavily coated with feed and during collision with other coke particles may stick together. These heavier coke particles may not be efficiently fluidized by the steam injected into the bottom of stripper section so that they subsequently pass downwards from the reactor section into the stripper section where they may adhere to and build up on the sheds in the stripper section, mainly on the uppermost rows of sheds. Conventionally, the stripper section has a number of baffles, usually termed "sheds" from their shape in the form of inverted channel sections extending longitudinally in several superimposed rows or tiers across the body of the stripper. The coke passes over these sheds during its downward passage through the stripper and is exposed to the steam which enters from the spargers at the bottom of the vessel below the sheds and is redistributed as it moves up the stripper. The solid coke from the reactor, consisting mainly of carbon with lesser amounts of hydrogen, sulfur, nitrogen, and traces of vanadium, nickel, iron, and other elements derived from the feed, passes through the stripper and out of the reactor vessel to a burner where it is partly burned in a fluidized bed with air to raise its temperature from about 480 to 700° C. (about 900° to 1300° F.), after which the hot coke particles are recirculated to the fluidized bed reaction zone to provide the heat for the coking reactions and to act as nuclei for the coke formation.

The Flexicoking™ process, also developed by Exxon Research and Engineering Company, is, in fact, a fluid coking process that is operated in a unit including a reactor and burner, often referred to as a heater in this variant of the process, as described above but also including a gasifier for gasifying the coke product by reaction with an air/steam mixture to form a low heating value fuel gas. The heater, in this case, is operated with an oxygen depleted environment. The gasifier product gas, containing entrained coke particles, is returned to the heater to provide a portion of the reactor heat requirement. A return stream of coke sent from the gasifier to the heater provides the remainder of the heat requirement. Hot coke gas leaving the heater is used to generate high-pressure steam before being processed for cleanup. The coke product is continuously removed from the reactor. In view of the similarity between the Flexicoking process and the fluid coking process, the term "fluid coking" is used in this specification to refer to and comprehend both fluid coking and Flexicoking except when a differentiation is required.

The stripping section of the fluid coking unit is located in the lower portion of the reactor. Coke particles from the reactor pass into the stripper where they are contacted with stripping steam from a sparger located at the bottom of the stripping section in order to remove hydrocarbon vapor phase products from the coke which is carried out of the bottom of the unit. As a result of the well-mixed nature of the reactor, a certain amount of coke entering the stripper is still coated with crackable hydrocarbon material. For this material, the stripper acts as an additional reaction section within which cracking and drying can occur. As this material progresses through the stripper, additional cracking reactions occur. For this reason, plug flow behavior is extremely desirable in the stripper in order to minimize the amount of crackable material sent to the burner or heater as hydrocarbon carryunder, where it is effectively downgraded to coke. With basic fluid cokers, unlike Flexicokers, this phenomenon is not greatly disadvantageous as the quantities are small but in the case of Flexicokers, this material is sent to the heater, where it is exposed to a high temperature, oxygen poor environment. Unreacted material that enters the heater can crack to form a full range of vapor phase products. These products are then carried up into the heater overhead where they can condense onto surfaces resulting in capacity and/or run length limitations.

The dense fluid bed behaves generally as a well-mixed reactor. However, model simulations using cold flow dynamics and tracer studies have shown that significant amounts of wetted coke can rapidly bypass the reaction section and contact the stripper sheds where a portion of the wet film is converted to coke, binding the coke particles together. Over time, hydrocarbon species from the vapor phase condense in the interstices between the particles, creating deposits which are very hard and difficult to remove. Current practice in fluid coking units is to raise reactor temperatures to accelerate the thermal cracking reactions. This enables the coke to dry more quickly and thereby reduce the amount of wetted coke that enters the stripper. However, the higher reactor temperature increases the rate of recracking of the hydrocarbon vapors and reduces the $C_4$+ liquid yield resulting in an economic debit.

Other attempts have previously been made to overcome this problem with varying degrees of success. One approach has been to improve stripper operation, for example, by fitting the strippers with steam spargers located underneath the stripper sheds, as reported by Hsiaotao Bi et al. in "*Flooding of Gas-Solids Countercurrent Flow in Fluidized Beds*" In Eng. Chem. Res. 2004, 43, 5611-5619.

Another approach both to reducing reactor fouling and to increase liquid yield has been to improve the atomization of the feed as it enters the bed with the expectation that improved atomization will reduce the extent to which the oil will be carried down in liquid form into the stripper. Conventional atomization nozzles used in the fluid coking process use steam to assist in spraying the heated resid or bitumen into the fluidized bed of hot coke particles: effective contacting of resid droplets and the entrained coke particles is important in improving reactor operability and liquid product yield. The injected spray forms a jet in the bed into which fluidized coke particles are entrained. A major concern with poorly performing atomization nozzles is that liquid-solid agglomerates tend to form in the bed, causing high local liquid loading on the solids with the formation of large wet feed/coke agglomerates. These heavier agglomerates may tend to segregate towards the lower section of the reactor and foul the internals of the reactor, particularly in the stripper section. With enhanced feed atomization performance, the contacting between the atomized feed and coke solids would be improved, resulting in an overall improvement in reactor operability, with longer run-lengths due to reduced stripper fouling, and/or higher liquid product yield due to lower reactor temperature operation. Higher liquid feed rates may also be facilitated by the use of improved feed nozzles.

A steam assisted nozzle proposed for use in fluid coking units is described in U.S. Pat. No. 6,003,789 (Base) and CA 2 224 615 (Chan). In this nozzle, which is typically mounted to the side wall of the fluid coker so that it extends through the wall into the fluidized bed of coke particles, a bubbly flow stream of a heavy oil/steam mixture is produced and atomized at the nozzle orifice. The nozzle which is used has a circular flow passageway comprising in sequence: an inlet; a first contraction section of reducing diameter; a diffuser section of expanding diameter; a second contraction section of reducing diameter; and an orifice outlet. The convergent sections accelerate the flow mixture and induce bubble size reduction by elongation and shear stress flow mechanisms. The second contraction section is designed to accelerate the mixture flow more than the first contraction section and as a result, the bubbles produced by the first contraction are further reduced in size in the second contraction. The diffuser section allows the mixture to decelerate and slow down before being accelerated for the second time. The objective is to reduce the average mean diameter of the droplets exiting the nozzle to a relatively fine size, typically in the order of 300 µm as it is reported that the highest probability of collision of heavy oil droplets with heated coke particles occurs when both the droplets and heated particles have similar diameters; thus a droplet size of 200 or 300 µm was considered to be desirable. The objective behind the nozzle of U.S. Pat. No. 6,003,789 is to produce a spray of fine oil droplets which, according to the conventional view, would result in better contact between the coke particles and the oil droplets. A subsequent approach detailed in concept in "Injection of a Liquid Spray into a Fluidized Bed: Particle-Liquid Mixing and Impact on Fluid Coker Yields", Ind. Eng. Chem. Res., 43 (18), 5663., House, P. at al, proposes that the initial contact and mixing between the liquid droplets and the hot coke particles should be enhanced, with less regard to the size of the liquid droplets in the spray. A spray nozzle using a draft tube is proposed and a nozzle of this type is also described in U.S. Pat. No. 7,025,874 (Chan). This nozzle device functions by utilizing the momentum of the liquid jet issuing from the nozzle orifice to draw solids into the draft tube mixer and induce intense mixing of the solids and liquid in the mixer and by so doing, enhance the probability of individual droplets and particles coming into contact. As a result, more coke particles were likely to be thinly coated with oil, leading to improvement in liquid yield; the production of agglomerates would be curtailed, leading to a reduction in fouling and the reactor operating temperature could be reduced while still achieving high liquid product yield by reducing the mass transfer limitation on the liquid vaporization process. The actual assembly comprises an atomizing nozzle for producing the jet which extends through the side wall of the reactor and an open-ended draft tube type mixer positioned horizontally within the reactor and aligned with the nozzle so that the atomized jet from the nozzle will move through the tube and entrain a stream of coke particles and fluidizing gas into the tube where mixing of the coke and liquid droplets takes place. The draft tube preferably has a venturi section to promote a low pressure condition within the tube to assist induction of the coke particles and fluidizing gas. This device has not, however, been commercially successful due to concerns over fouling of the assembly in the fluidized bed.

The circular exit orifice on the nozzles shown, for example, in the Base patent creates a cylindrical plume of liquid emitting from the nozzle exit; this plume has a minimum area to perimeter ratio and this creates a significant hindrance to the penetration of solid particles to the central core of the jet, possibly leading to contact between the hot coke particles and the injected oil stream which is less than optimal.

An improved mixing arrangement is described in U.S. Pat. No. 7,140,558 (McCracken); this device, referred to here as a Bilateral Flow Conditioner, brings the oil and steam into the main flow conduit leading to the nozzle through feed conduits which are disposed at an acute angle to the main flow conduit and at an angle to each other. In addition, a flow restrictor is disposed in the steam line at the point where it enters the main conduit so that the steam is accelerating as it enters the main conduit. This configuration for the mixing section of the nozzle is stated to give an improvement in flow characteristics.

US 2012/0063961 (Chan) describes an improved liquid feed nozzle assembly for a circulating fluid bed reactor which has a throttle body premixer to combine the heavy oil liquid feed with atomization steam upstream of a nozzle body to form a liquid feed/steam mixture with a downstream conduit leading to a discharge nozzle body adapted to shear the liquid feed/steam mixture to create liquid feed droplets of reduced size with a disperser at the outlet of the discharge nozzle to provide a spray of liquid feed having an increased surface area relative to a cylindrical jet. The nozzle assemblies are particularly useful in fluid coking units using heavy oil feeds such a tar sands bitumen.

The premixer, located upstream of the nozzle tip plays an important role in nozzle performance. The premixer intimately mixes steam with bitumen, creating a bubbly flow in the conduit leading to the nozzle. The quality of the dispersed bubbly flow is critical to the resultant atomization performance. A good premixer creates a stable bubbly flow over a wide range of steam and bitumen flow rates, resulting in a large operating window for the feed nozzle. This large operating window decreases the likelihood of entering into the pulsation regime, where atomization is poor, causing the formation of large, wet agglomerates.

While the nozzle assembly described in US 2012/0063961, with its opposed, impinging steam jets, provides a very stable (less dynamic pressure pulsation) bubbly flow over a much wider range of operating conditions compared to the BFC premixer described in U.S. Pat. No. 7,140,558, it has been found with operating experience that there were concerns of potential erosion in the vicinity of the venturi throat with moderate degrees of wear in the shape of a horseshoe vortex appearing in the region downstream of the steam injection ports.

There is therefore a need for a nozzle assembly which is capable of minimizing erosion in the region where the atomizing steam and heavy oil feed meet and mix, while still maintaining adequate mixing of the steam and the bitumen with controlled low pressure pulsation downstream of the mixer.

SUMMARY OF THE INVENTION

We have now devised an improved premixing section for a heavy oil feed injector assembly. The modified premixer, which mixes steam and bitumen to generate a dispersed bubbly flow in the conduit leading to the atomization nozzle in the manner described in US 2012/0063961 has a convergent-divergent throat section but, characteristically, the atomizing gas, usually steam, is introduced through two or more orifices just upstream of the convergent section which leads the feed into the throat instead of inside the throat of the venturi. This configuration has been found to enhance the mixing of the steam and bitumen, resulting in improved stability and reducing erosion.

According to the present invention, therefore, improved mixing between the heavy oil feed and the atomizing steam may be achieved by the use of a pre-mixer in the form of a radial ported throttle body steam injector at the entry of a convergent-divergent section in the nozzle assembly. This mixer provides improved stability to the operation of the nozzle and also enables a wider operating window extending over a broader range of conditions to be used. When used with a nozzle with an improved flow conditioner and disperser configuration, improved contacting between the coke particles and the oil in the reactor can be achieved.

The nozzle assembly comprises a premixer which is connected by means of a flow conduit in fluid flow relationship to a discharge nozzle which discharges the atomized feed as a spray onto the particles circulating inside the reactor. The flow conduit between the oil and steam connections on the outside of the reactor wall and the nozzle tip inside, typically extends about 40-150 cm long in current reactors. The preferred throttle body premixer described below stabilizes the flow over longer conduits, possibly over 150 cm in length, while, at the same time, maintaining a wide operating window for steam/oil rates with a reduced possibility for jet pulsation at high relative steam rates or choking at high oil rates.

The stabilizing effect of the premixer may be enhanced by utilizing certain flow conditioners or stabilizers in the flow conduit between the premixer and the discharge nozzle. The spray pattern from the discharge nozzle may also be enhanced and the contact between the oil and the particles in the fluid bed improved by the use of an appropriate disperser at the orifice of the discharge nozzle.

According to the invention the atomizing steam is introduced into the oil stream in a throttle body pre-mixer defined by radial steam injection ports immediately upstream of a convergent-divergent constriction or throat in a flow conduit. The atomizing steam is injected through the radially-disposed inlet ports at a higher pressure than the oil stream; the intense mixing which takes place downstream of the constriction results in an improved stability for the spray.

The improvement in oil/coke particle contact resulting from the use of this premixer may be achieved with a plain circular orifice at the reactor end of the nozzle assembly but a further improvement may be achieved—with a resulting reduction in the film thickness of the oil on the coke particles—by the use of a multilobe disperser at the orifice of the discharge nozzle as described in US 2012/0063961. This disperser provides a jet plume with an increased surface area in a spray pattern corresponding to the shape of the flow channels in the disperser, resulting in a significant improvement in the contacting between the feed jet and the solids in the bed and in the entrainment of the solids by the liquid jet.

In its preferred form the disperser at the orifice of the discharge nozzle comprises a body having a central flow passage leading from the rear (feed side) of the body towards the discharge end of the disperser and plurality of dispersing lobes within the body and communicating with the central flow passage. In a preferred form the multilobe disperser has a cloverleaf configuration normally comprising from three or four divergent, quasi-conical flow passages symmetrically disposed around a central axis and open to the central flow passage from the flow conduit. These dispersing lobes form a dispersed pattern of oil spray droplets with a configuration that matches that of the lobes in the disperser body. Each lobe is defined by a wall formed in the body of the disperser with the wall of each lobe defining a segment of a hollow cone; the axes of the hollow cones intersect symmetrically with the central flow passage so that each hollow cone is open along its length to the flow passage to define an increasing multilobe exit passage whose cross-sectional area increases from the rear towards the front of the disperser body. In this form, the disperser is of a cloverleaf configuration, either trilobe or quadrulobe, with three or four lobes formed in the body.

The disperser is normally fabricated as an extension from the circular nozzle body at the end of the flow passage which expands to a wider, non-circular, multilobar opening which increases the perimeter-to-area ratio of the nozzle orifice. With the disperser, the liquid jet issuing from the nozzle orifice will also be a corresponding non-circular form, greatly enhancing not only the liquid dispersion, but also increasing the surface area for interface and entrainment between the jet and the fluidized bed of solids. As an alternative to the lobed disperser, a simple fan shaped disperser may be used to increase the surface area of the spray relative to that of a plain circular spray pattern.

The flow conduit connecting the premixer with the discharge nozzle also functions to control spray stability and effectiveness. While a plain cylindrical flow conduit between the premixer and the nozzle is effective with the present premixer configuration and more so with the multilobe disperser, control over the droplet size in the spray may be achieved by the use of a flow stabilizer or conditioner in the flow conduit between the premixer and the discharge nozzle.

The nozzle assembly is useful for injecting fluids into various types of circulating fluid bed reactors in which good contact between the components of the fluidized bed and the injected fluid is required. The nozzle assembly is particularly useful in fluid coking reactors but is potentially useful in other CFB reactors where similar problems are encountered.

In the preferred form used in fluid coking units, the reactor of the unit comprises:
  a dense bed reaction section confined by the reactor wall, typically of frusto-conical configuration with its major cross-section uppermost,
  a base region below the dense bed reaction section at which fluidizing gas in injected to fluidize the dense bed of finely-divided solid coke particles in the dense bed reaction section,
  heavy oil inlets with their feed injection nozzles located around the periphery of the reactor wall at multiple elevations above the base region,
  a plenum or scrubber section above the dense bed reaction section and separated from the dense bed reaction section,
  cyclones at the top of the dense bed reaction section, each of which has a cyclone inlet for the flow of exiting gas and coke particles, a cyclone gas outlet exhausting into the plenum above the reaction section, and a cyclone dipleg for returning coke particles separated from the gas in the cyclone into the dense bed reaction section,
  a stripping section at the base region of the reactor comprising stripper sheds and spargers for stripping steam.

The reactor will be coupled in the unit to a burner/heater by means of coke lines in the normal way: a cold coke transfer line takes coke from the bottom of the stripper to the burner/heater and a hot coke return line brings hot coke from the burner/heater back to the reactor. In the case of a Flexicoker, the gasifier section follows the heater vessel as described above.

In the fluid coker the feed inlet nozzles are disposed at the upper end of the reactor and substantially horizontally around the periphery of the reactor; these feed inlet nozzles lead the heavy oil feed into the reactor. They each have a feed nozzle assembly as described above preferably with the modified premixer and flow conditioner and with a multi-lobe disperser to provide the optimal configuration for the spray entering the reactor from the nozzle.

The invention in its preferred form provides a circulating fluid bed reactor having a reactor wall of circular cross section about a vertical axis, a lower inlet for fluidizing gas and nozzle assemblies for a liquid heavy oil feed and atomization steam proximate the upper region of the reactor above the lower fluidizing gas inlet and around the reactor wall. The nozzle assemblies each extend substantially horizontally through the reactor wall into the reactor with a discharge nozzle orifice within the reactor and each has an inlet for the liquid heavy oil feed at the end remote from the discharge nozzle. Each nozzle assembly comprises:
  a premixer section to combine the liquid heavy oil feed with atomization steam to form a liquid feed/steam mixture comprising gas bubbles; the premixer section comprises successive converging and diverging zones in the direction from the feed inlet to the discharge nozzle and a central throat section connecting the converging and diverging zones, with a plurality of radial steam inlet ports located at the entry of the converging zone;
  a flow conduit section following and connected to the outlet of the premixer section, extending from the premixer section to a discharge nozzle, to convey a flow of the liquid/steam mixture created by the premixer to the discharge nozzle;
  a discharge nozzle having a convergent entry following and connected to the flow conduit section to shear the liquid feed/steam mixture and create liquid feed droplets of reduced size upon exiting from the nozzle.

The nozzle assembly utilizes the converging-diverging premixer section to introduce atomization steam into the heavy oil stream under pressure just ahead of the convergence section which narrows down to the throat of the throttle body. The stability in feed flow imparted by the use of the premixer is further improved by the use of the constricting-expanding flow conditioner or stabilizer in the flow conduit between the premixer and the nozzle orifice.

DRAWINGS

DETAILED DESCRIPTION

Nozzle Assembly

Figure 1:
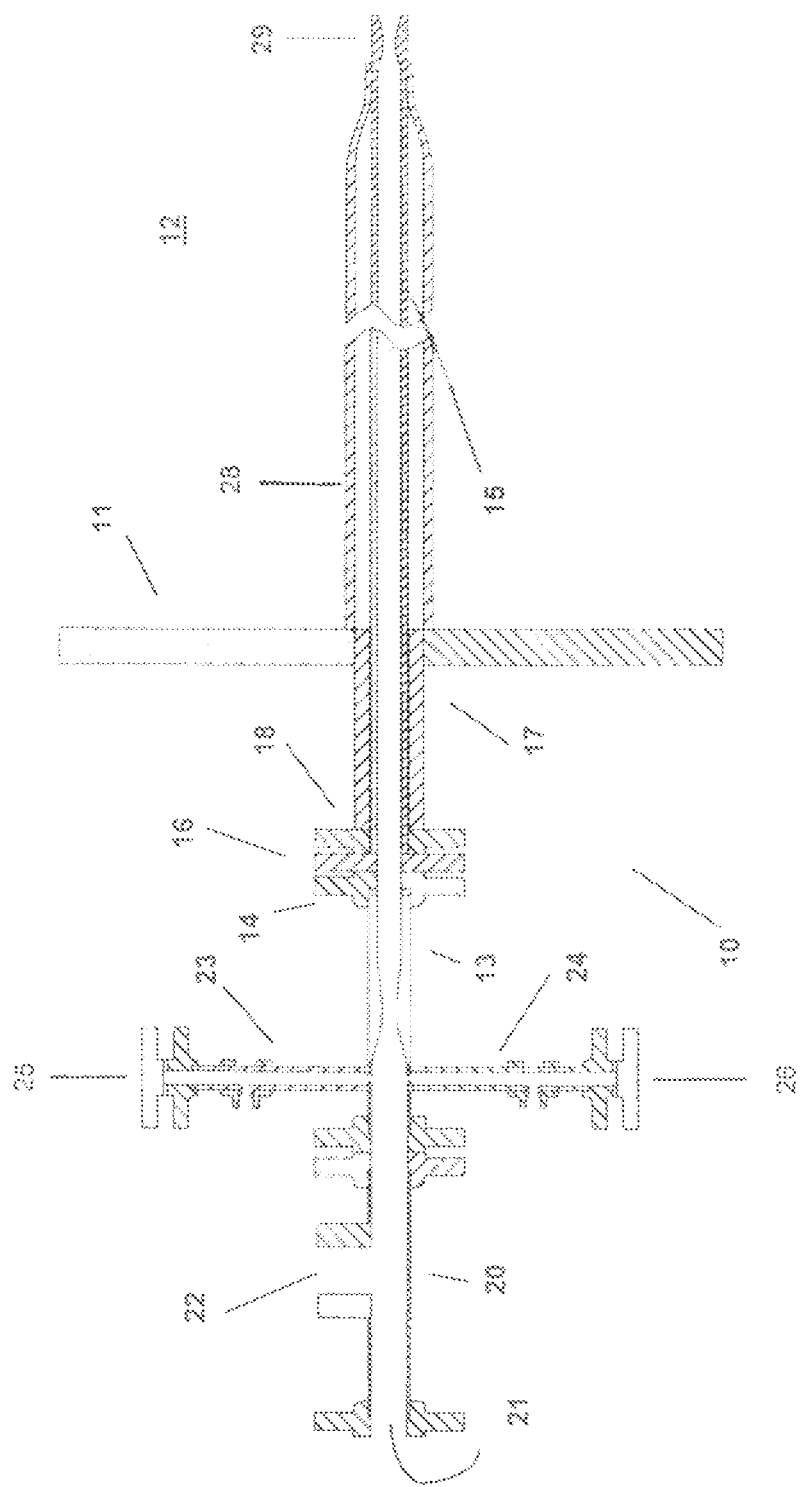
FIG. 1 shows a nozzle assembly in section incorporating the throttle body premixer.

A complete nozzle assembly for producing the improved feed dispersion in the fluidized bed is shown in FIG. 1. The nozzle assembly 10 which extends through the wall 11 of the reactor into its interior 12, comprises a throttle body premixer section 13 with flange 14 fixed to its discharge or downstream end. Flange 14 may suitably be welded onto the end of the premixer section or attached in any other suitable manner, e.g. by threading. Flow conduit 15 which extends from the premixer to the discharge nozzle is fitted with flange 16 at its entry or upstream end to provide a fluid flow connection with the premixer flange 14. Flow conduit 15 of circular cross-section with discharge nozzle 29 at its tip end inside the reactor is retained, together with the premixer section on flanged end 18 of exterior support shroud 17 in the conventional manner with through bolts (not shown). Conduit 20 is flanged onto the entry side of premixer section 13 and extends to a cleaning port 21 which, in operation is normally closed by a flanged-on cover plate (not shown). The cleaning port is provided to allow for the nozzle assembly to be cleaned of fouling by passing a cleaning rod in through the uncovered cleaning port as far as the discharge nozzle and, if the rod is small enough, through the discharge orifice at the inner end of the nozzle.

Figure 2:
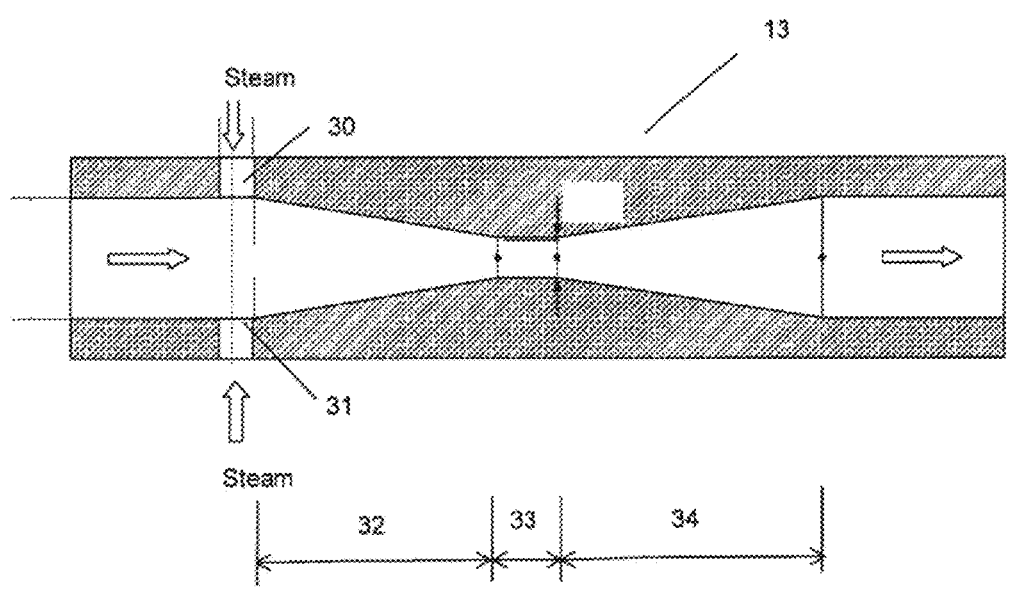
FIG. 2 shows an enlarged section of the preferred premixer body.

Inlet port 22 is provided for the heavy oil feed and atomizing steam enters through two radially opposed steam inlet lines 23, 24, into the steam inlet ports 30, 31 in the body of the premixer (shown in FIG. 2). The inlet ports 30, 31 are disposed at the beginning of the convergence zone forming the entry to the throttle body constriction in the premixer section in which vigorous mixing of the heavy oil feed with the injected steam is initiated. The steam lines are also provided with cleaning ports 25, 26 at their outer ends, normally covered by flanged cover plates, to permit cleaning rods to be passed to the inlet ports in the body of the premixer.

Conduit 15, leads through the wall 11 of the reactor and inside the reactor is encased in shroud 28 as far as the discharge nozzle body, mainly for structural support and to protect the conduit from erosion by the solids circulating in the reactor.

Premixer

The objective of the premixer is to create a stable two-phase flow for effective atomization in the reactor. A preferred configuration for the throttle body premixer section that mixes the steam and heavy oil feed to generate a dispersed "bubbly" flow in the conduit leading to the atomization nozzle is shown to better advantage in detail in FIG. 2. Premixer 13 has the steam inlets ports 30, 31 which admit the steam from inlet lines 23, 24 located at the beginning of a convergent section 32 which leads to a throat 33 and then to a divergent section 34; the steam is introduced through the ports immediately ahead of convergent throat section at a pressure higher than that of the oil. The inlet and outlet diameters of the passage through the premixer will generally be the same.

The steam ports generate high velocity steam jets where the steam mixes with the liquid feed and the steam/oil mixture enters the throat of the premixer at maximum shear, creating dispersed bubbly flow. The number of ports may be varied according to service requirements and the size of the assembly and usually from two to six are suitable, in most cases from two to four. Two ports have been found to give good results and also can be made large enough to reduce the likelihood of becoming fouled. Symmetrical radial port disposition is preferred, e.g. with two ports diametrically opposite and with four ports, at the quadrants. The steam ports are preferably opposed in pairs to promote mixing and atomization of the feed by the impact of the opposed steam jets from the ports onto one another; erosion of the premixer walls by impingement of steam from an unopposed port is also reduced. The mixing of the gas and liquid just at the entry to the throat region is considered optimal for good mixing, stable bubble flow with reduced pressure pulsation and reduced erosion in the throat section itself. The steam lines may be provided, if necessary, with flanged-off cleaning ports as shown which will admit cleaning rods to be passed down as far as the section upstream of the converging section of the throttle body.

Significant performance criteria for the premixer are: convergence angle at entry to the throat, throat diameter and length, divergence angles from the throat, entry and exit diameter. These values are best set empirically depending upon feed characteristics (mainly viscosity) and the required flow rate. Typically, a low convergence/divergence angle is preferred, normally from about 3 to 15° (cone half angle) with values between 4 and 8° preferred although at higher rates of flow, the differences in performance as indicated by the Instability Index tend to disappear so that larger values of the half angle e.g. 20° are acceptable. The angles of convergence and divergence are normally substantially identical to give a symmetrical convergent/divergent zone, preferably with a cylindrical central zone between the convergence zone and the divergence zone Typical approximate dimensions for a premixer with a capacity of 9270 kg/hr are as shown in Table 1 below (dimensions all in mm.):

TABLE 1

| Parameter | |
|---|---|
| Inlet diam. | 40 |
| Outlet diam. | 40 |
| Convergent length | 65 |
| Divergence length | 65 |
| Throat length | 25 |
| Throat diam. | 25 |
| Port diam. | 10 |
| Converge/Diverge angle | 5.7° |

The maximum erosion rate for the original (as in US 2012/0063961) and the present modified throat are shown in Table 2 along with the standard deviation of the liquid volume fraction downstream of the mixer, which is used to quantify the mixing.

TABLE 2

| Throat Type | Maximum Erosion Rate ($10^{-6}$ m/s) | Std. Dev. Of Liquid Vol. Fraction. |
| --- | --- | --- |
| Original | 1.9 | 0.135 |
| Modified | 0.31 | 0.123 |

A different material, such as Stellite, could also be used to construct the throat region of premixers, or alternatively, it could be made by Hot Isostatic Pressing in order to reduce erosion.

Flow stability is maintained relatively more constant over a wider range of liquid flow rates with smaller gas ports, e.g. about 7 mm but again, the differences tend to disappear at higher liquid flow rates so that the larger ports are preferred for their greater resistance to fouling. In addition, the use of the larger gas ports reduces the velocity of the steam and minimizes erosion. Flow stability is favored by the smaller throat diameters although the larger diameters result in a smaller pressure drop but here, throat size must be selected in accordance with the desired flow rate for the nozzle assembly.

One highly favorable feature of the throttle body premixer is that it facilitates the use of longer flow conduits between the premixer and the nozzle by maintaining flow stability over a broad range of flowrates. While the Bilateral Flow Conditioner provides comparable performance to the throttle body premixer with short flow conduits (up to about 80 cm long), the flow in longer conduits, e.g. 130 cm or longer, at gas/liquid ratios over about 1.8 wt. pct., tends to destabilize rapidly in cold flow testing.

The premixer necessarily has to be designed to accommodate the desired flow rate of heavy oil with the concomitant steam flow for good atomization. Generally, the steam/oil ratio will be in the range of 0.3 to 1.2 percent by weight of the oil and usually rather less, in the range 0.4 to 0.9 steam/oil with ratios of about 0.86 likely to be typical. Feed header pressures for the steam are typically in the range of 1500 to 2000 kPag (about 200 to 290 psig).

Flow Conditioner

Maintenance of the dispersed, stable, bubbly flow formed by the use of the premixer over a broad range of nozzle operating conditions enhances the operating flexibility of a particular nozzle assembly. In the conduit leading up to the nozzle the liquid is the continuous phase and gas (steam) bubbles are present in the liquid. At the nozzle exit a phase inversion occurs and the gas becomes the continuous phase, resulting in liquid droplets dispersed in gas. The shear in the premixer and flow conditioner causes a reduction in the size of the gas bubbles. When the dispersed bubbly flow is not carried fully through to the nozzle orifice, the nozzle will tend to send slugs of liquid feed into the fluidized bed of solids. The nozzle assembly functions well with a plain, tubular flow conduit of constant cross-section between the premixer and the discharge nozzle as shown in FIG. 1 but the turbulent flow in conduit 15 downstream of the premixer 13 may be further stabilized and the dispersed bubbly flow maintained prior to the discharge nozzle by means of a flow stabilizer or conditioner in the flow conduit. In its simplest form the flow conditioner comprises a region of reduced cross-sectional flow area in the conduit which creates an accelerated flow of the mixture upstream of the discharge nozzle. Thus, in its simplest form the flow conditioner would comprise a collar located in the conduit between the premixer and the discharge nozzle. The collar may have a plain rectangular section or it may have angled faces on each side. In either case, the flow conditioner is preferably located for improved flow stability towards the discharge end of the flow conduit, preferably within the second half of its length between the premixer and the discharge nozzle, that is, closer to the discharge nozzle than to the premixer. Setting the flow conditioner close to the premixer gives only a limited improvement in stability as compared to a plain flow conduit at substantially all gas flow rates; location approximately 50 percent along the flow conduit between the premixer and the discharge nozzle gives a notable improvement while location within a few conduit diameters, e.g. 2 to 10, preferably 2 to 5 pipe diameters of the discharge nozzle, provides optimum flow stability at the discharge nozzle.

Figure 3:
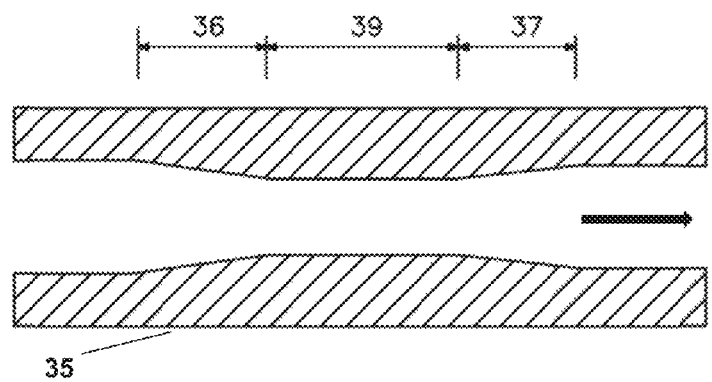
FIG. 3 shows a section of a flow stabilizer-conditioner for use in the flow conduit between the premixer and the discharge nozzle.

One preferred form of flow conditioner is shown in FIG. 3 where the conditioner 35 comprises an annular constriction providing a progressive convergence zone followed by a progressive divergence zone, similar to that of the premixer. This form of flow conditioner can be machined and connected into the conduit, e.g. by welding or threading. Flow conditioner 35 has a convergent entry zone 36 defining a section of a cone and a divergent discharge section 37 again defining a section of a cone with an intermediate cylindrical throat section 39. Flow takes place in the direction shown by the arrow.

Figure 4:
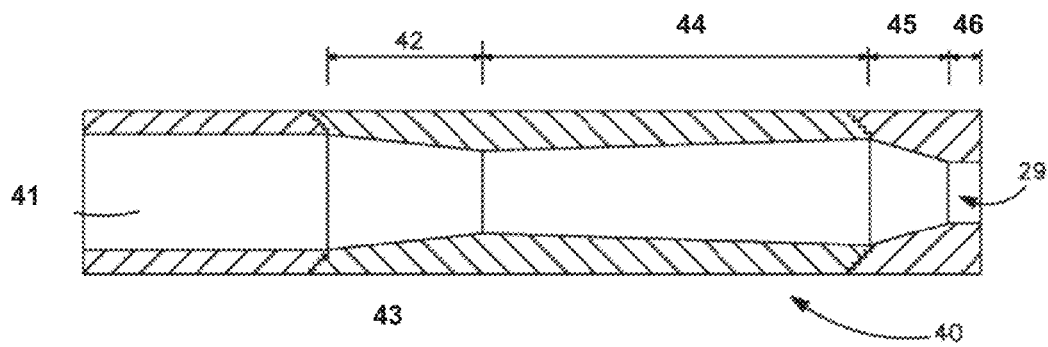
FIG. 4 shows a section of an alternative configuration for the flow stabilizer-conditioner.

An alterative configuration for the flow conditioner is shown in FIG. 4. Like the conditioner of FIG. 3, this section is designed to create an appropriate shearing force (through the pressure drop across the nozzle body) to form small, uniform feed droplets while also providing sufficient momentum to convey the droplets in the jet discharged from the nozzle well into the bed of solids. The flow conditioner 40 has an axial flow passageway 41 extending from one end to the other with a suitable connector at the upstream end for connection to the end of conduit 15; the connector may be, for example, a weld or a threaded bushing. At its other end, the flow conditioner is welded, threaded or otherwise attached onto the body of discharge nozzle 29. The central passageway in the flow conduit comprises, in sequence: a convergence zone 42 which narrows to a throat 43 followed by a divergent diffusion zone 44 which is followed by a second convergence zone 45 in the body of discharge nozzle 29 followed, in turn by the nozzle orifice itself 46. In this case, the flow conditioner is considerably longer and is provided with a more gradual divergence in the diffusion zone 45, as compared to the flow conditioner of FIG. 3. This form of flow conditioner has been found to give a spray with fine liquid droplets with an average droplet size of less than 200 microns even when operating with a plain nozzle (no disperser), which gives better penetration into the bed although oil/coke particle contact in the bed may be improved with the flow disperser.

The diameter and length of circular conduit 15 in the nozzle body downstream of the premixer leading to the flow conditioner section will also affect the stability of the dispersed bubbly flow and therefore the atomization performance of the nozzle. An excessively long residence time in the conduit will lead to coalescence of bubbles and instability of the two-phase flow. Hence there is a balance in the selection of the conduit diameter/length ratio between the need to keep the fluid residence time in the conduit to a minimum and the contribution of the pressure drop in the conduit to the overall pressure requirement for the nozzle.

The annular constriction-expansion of the flow stabilizer or conditioner may conveniently be fabricated in a manner similar to the preferred form of the throttle body premixer with equal entry and discharge angles or, alternatively, with a long, progressively expanding divergence-expansion zone following the throat of the constriction. This long divergence zone may be extended up to the point where the converging portion of the discharge nozzle commences or it may stop short of it. The combination of the convergent/divergent flow conditioner in the flow passage connecting the premixer and the nozzle with the converging flow passage in the nozzle body is highly effective to impart shear to the liquid oil droplets in the mixture to reduce their size upon exiting the discharge nozzle.

With either form of flow conditioner, the purpose of the first convergence zone is to accelerate the steam/oil mixture from the premixer to reduce bubble size by elongation and shear stress. Following this, the divergence or diffusion section of expanding diameter allows the mixture to decelerate so that sufficient acceleration may be attained in the next convergence section in the nozzle to reduce bubble size further and preferably for accelerating the mixture with greater acceleration than in the first contraction section so as to reduce bubble size by elongation and shear stress yet further before the mixture enters the discharge orifice and emerges in the form of a jet of relatively fine oil droplets distributed in the steam.

The nozzle assembly is preferably designed in accordance with the following considerations:

- The convergence zone on the upstream side of the flow conditioner should accelerate the mixture to generate a flow of relatively small bubbles due to the expansion of the flow in the subsequent divergent (diffusion) zone downstream of the convergence zone. The second convergence zone located at the end of the flow passage in the nozzle body just before the orifice should accelerate the mixture more than that achieved by the first convergence zone. A zone that provides about twice the acceleration is appropriate and preferred.
- If the fine bubbles produced by the first convergence zone and the diffusion zone are to be further reduced in size, it is necessary to subject them to relatively increased elongation and shear stress; and to this end, the diffusion zone should increase the diameter of the flow passage sufficiently that the desired acceleration in the second convergence zone can be achieved. However the length of this convergence zone needs to be limited to avoid excessive recombination of bubbles. A 3° convergence was found to be satisfactory while a 6° convergence in this zone (total angle), was much less useful. The angle of convergence in the second convergence zone is therefore normally in the range of 2 to 6°, preferably 3 to 5°.

Disperser

As noted above, a plain cylindrical nozzle, i.e. with a convergent entry followed by a conical outlet, may be used with the preferred premixer but an improvement in oil-solid contact is possible with the use of a disperser at the nozzle orifice. The purpose of the disperser is to draw liquid off the centerline to maximize liquid contacting with the solids. This allows the feed to coat the coke particles more uniformly and on average, with thinner films. Since the diffusion path is shorter in a thinner film, there tends to be less secondary cracking resulting in improved liquid yields. Hence further improvement in yield comes primarily from the use of a disperser on a nozzle. Several types of dispersers were evaluated in early testing; these included "ninja star", multi-holed, multi-lobe e.g. clover and fan designs. Based on patternator flux measurements, the "ninja star" and multi-holed design were not found to be effective at pulling heavy oil droplets away from the liquid core. The clover and the bilobar or fan patterns providing a flat, bilobe or fan-shaped spray pattern for the jet had similar performance in the jet interaction with the fluidized bed; the preferred multi-lobe clover configuration is based on jet/bed interaction testing which showed generally better performance for dispersers with higher perimeter to area ratios with enhanced solids entrainment. The patternator is an instrument made for testing the pattern of spray from a nozzle. It replaces mechanical patternation and its high speed and elevated resolution allow it to be used for a variety of applications where the uniformity and pattern of sprays is important. The technology was developed by En'Urga Inc. of West Lafayette, Ind. The instrument is stated by En'Urga to be covered by U.S. Pat. No. 6,184,989.

Figure 5A:
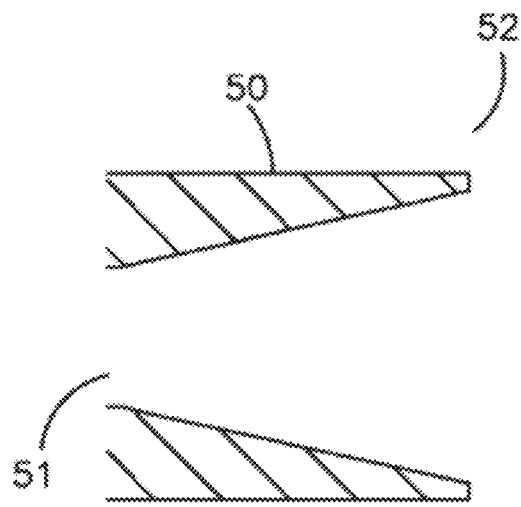
FIG. 5A shows a longitudinal section of a multilobe disperser.
Figure 5B:
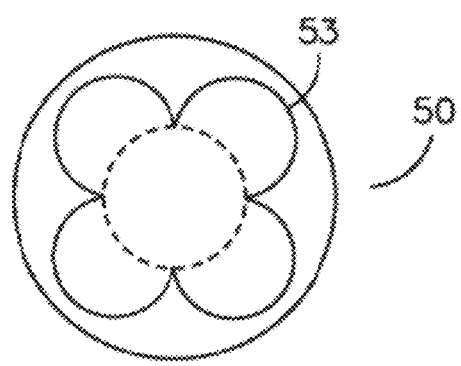
FIG. 5B shows a cross section at the extremity of the multilobe disperser of FIG. 5A.

A specific embodiment of a clover disperser is shown in FIGS. 5A and 5B. The disperser 50 has a flow passage from the inlet 51 at the end of the convergent region of the nozzle body to the exit orifice 52 which progressively increases in cross section. This allows the steam to expand as the pressure is reduced upon leaving the constricted nozzle passage and, in so doing, disperse the oil/steam mixture into an expanding pattern dictated by the disperser geometry. The multi-lobe disperser has four lobes 53 machined into the body, the walls of each lobe defining a segment of a hollow cone. The axes of the several hollow cones intersect symmetrically with the central axis of the disperser to provide the increasing cross-sectional area of the disperser allowing the steam to expand and break up the oil jet into a fine spray. The number of lobes in a multi-lobe disperser may be chosen according to feed characteristics and the physical space available; generally from two to six lobes are suitable and in most cases, four will be the most suitable number. A two-lobed design will resemble a figure-eight in end view which will give a pattern similar to a fan but with a narrowed waist area, helping to preclude the formation of a strong central core to the jet; a three-lobe design will resemble a three-leaf clover and so on. In use, a four-leaf clover has been found to give better oil/coke contact when used in the "x" orientation rather than the "+", that is, with the lobes at 45°/135° to the horizontal as opposed to the vertical/horizontal orientation of the "+".

The invention claimed is:

1. A circulating fluid bed reactor having a reactor wall of circular cross section about a vertical axis, a lower inlet for fluidizing gas and feed injection nozzle assemblies for a liquid heavy oil feed and atomization steam above the lower fluidizing gas inlet and around the reactor wall, the nozzle assemblies each extending through the reactor wall into the reactor with a discharge orifice within the reactor and a feed inlet for the liquid heavy oil feed at the end remote from the discharge orifice; each feed injection nozzle assembly comprising:

a premixer section to combine the liquid heavy oil feed with atomization steam to form a liquid feed/steam mixture comprising gas bubbles in liquid, the premixer section comprising successive converging and diverging zones with a plurality of radial steam inlet ports located at the entry of the converging zone;

a flow conduit section following and connected to the outlet of the premixer section, extending from the premixer section to a discharge nozzle, to convey a flow of the liquid/steam mixture created by the premixer to the discharge nozzle;

a discharge nozzle having a convergent entry following and connected to the flow conduit section to shear the liquid feed/steam mixture and create liquid feed droplets of reduced size upon exit from the discharge nozzle.

2. A circulating fluid bed reactor according to claim 1 in which the premixer section includes a central cylindrical throat section connecting the converging and diverging zones.

3. A circulating fluid bed reactor according to claim 1 in which the nozzle assembly has a flow conduit section comprising successive convergence and divergence zones to reduce the size of the gas bubbles in the liquid feed/steam mixture from the premixer.

4. A circulating fluid bed reactor according to claim 3 further comprising a disperser in which the disperser has a body comprising a central flow passage of circular cross-section and a plurality of lobes in the body, the wall of each lobe defining a segment of a hollow cone with the axes of the hollow cones intersecting symmetrically with the central axis of the disperser to define an increasing multilobe exit passage of increasing cross-sectional area in the disperser body.

5. A fluid coking reactor according to claim 4 in which the premixer section includes a central cylindrical throat section connecting the converging and diverging zones.

6. A fluid coking reactor according to claim 5 further comprising a disperser in which the disperser has a body comprising a central flow passage of circular cross-section and a plurality of lobes in the body, the wall of each lobe defining a segment of a hollow cone with the axes of the hollow cones intersecting symmetrically with the central axis of the disperser to define an increasing multilobe exit passage of increasing cross-sectional area in the disperser body.

7. A fluid coking reactor according to claim 4 in which the nozzle body has a flow conduit section comprising successive convergence and divergence zones to reduce the size of the gas bubbles in the liquid feed/steam mixture from the premixer.

8. A fluid coking reactor according to claim 4 in which the nozzle assembly has a flow conduit section comprising tandem convergence zones separated by a diffusion zone.

9. A fluid coking reactor according to claim 4 in which the feed injection nozzles each comprise a multilobe disperser at the outlet of the discharge nozzle to generate a correspondingly shaped liquid jet plume having an increased surface area relative to a cylindrical jet.

10. A circulating fluid bed reactor according to claim 1 in which the nozzle assembly has a flow conduit section comprising tandem convergence zones separated by a diffusion zone.

11. A circulating fluid bed reactor according to claim 1 which comprises a multilobe disperser at the outlet of the discharge nozzle to generate a correspondingly shaped liquid jet plume having an increased surface area relative to a cylindrical jet.

12. A fluid coking reactor having a reactor wall of circular cross section about a vertical axis, a lower inlet for fluidizing gas and feed injection nozzle assemblies for a liquid heavy oil feed and atomization steam above the lower fluidizing gas inlet and around the reactor wall, the nozzle assemblies each extending through the reactor wall into the reactor with a discharge nozzle orifice within the reactor and an inlet for the liquid heavy oil feed at the end remote from the discharge nozzle; each feed injection nozzle assembly comprising:

a premixer section to combine the liquid heavy oil feed with atomization steam to form a liquid feed/steam mixture comprising gas bubbles in liquid, the premixer section comprising successive converging and diverging zones and a central throat section connecting the converging and diverging zones, with a plurality of radial steam inlet ports located at an entry of the converging zone;

a flow conduit section following and connected to the outlet of the premixer section, extending from the premixer section to a discharge nozzle, to convey a flow of the liquid/steam mixture created by the premixer to the discharge nozzle;

a discharge nozzle having a convergent entry following and connected to the flow conduit section to shear the liquid feed/steam mixture and create liquid feed droplets of reduced size upon exit from the discharge nozzle.

13. A fluid coking unit having a fluidized bed coking reactor which comprises:

a reaction section of circular cross section about a vertical axis and confined by a reactor wall, a base region below the dense bed reaction section at which fluidizing gas in injected to fluidize a dense bed of finely-divided solid coke particles in the dense bed reaction section, a plurality of heavy oil inlets located around the periphery of the reactor wall at multiple elevations above the base region, a scrubber section above the reaction section and separated from the dense bed reaction section, at least one cyclone at the top of the dense bed reaction section, each cyclone having an inlet for gas and coke particles exiting the reaction section, a cyclone gas outlet exhausting into the scrubber section and a cyclone dipleg for returning coke particles separated from the gas in the cyclone into the dense bed reaction section, a stripping section at the base region of the reactor, feed injection nozzle assemblies each extending through the reactor wall into the reactor with a discharge orifice within the reactor and an inlet for liquid heavy oil feed at the end remote from the discharge nozzle; each feed injection nozzle assembly comprising:

a premixer section to combine the liquid heavy oil feed with the atomization steam to form a liquid feed/steam mixture comprising gas bubbles in liquid, the premixer section comprising successive converging and diverging zones with a plurality of radial steam inlet ports located at an entry of the converging zone;

a flow conduit section following and connected to the outlet of the premixer section, extending from the premixer section to a discharge nozzle, to convey a flow of the liquid/steam mixture created by the premixer to the discharge nozzle;

a discharge nozzle having a convergent entry following and connected to the flow conduit section to shear the liquid feed/steam mixture and create liquid feed droplets of reduced size upon exit from the discharge nozzle.

14. A fluid coking reactor according to claim 13 in which the premixer section includes a central cylindrical throat section connecting the converging and diverging zones.

15. A fluid coking unit according to claim 13 in which the nozzle body has a flow conduit section comprising successive convergence and divergence zones to reduce the size of the gas bubbles in the liquid feed/steam mixture.

16. A fluid coking unit according to claim 13 in which the nozzle assembly has a flow conduit section comprising tandem convergence zones separated by a diffusion zone.

17. A fluid coking unit according to claim 13 in which each feed injection nozzle assembly comprise a disperser at the outlet of the discharge nozzle to generate a correspondingly shaped liquid jet plume having an increased surface area relative to a cylindrical jet, the disperser having a body comprising a central flow passage of circular cross-section and a plurality of lobes in the body, the wall of each lobe defining a segment of a hollow cone with the axes of the hollow cones intersecting symmetrically with the central axis of the disperser to define an increasing multilobe exit passage of increasing cross-sectional area in the disperser body.

18. A fluid coking unit according to claim 17 in which the disperser has a body comprising four lobes, the wall of each lobe defining a segment of a hollow cone with the axes of the hollow cones intersecting symmetrically with the central axis of the disperser to define an increasing quadrulobe exit passage of increasing cross-sectional area in the disperser body.

19. A fluid coking unit according to claim 13 in which the reactor is coupled in the unit to a burner/heater by means of coke lines comprising a cold coke transfer line to transfer coke from the bottom of the stripper to the burner/heater and a hot coke return line to bring hot coke from the burner/heater back to the reactor.

20. A fluid coking unit according to claim 17 which includes a coke gasifier section connected to the heater/burner by means of a coke transfer line.

\* \* \* \* \*